US006785681B2

United States Patent
Keskar et al.

(10) Patent No.: US 6,785,681 B2
(45) Date of Patent: Aug. 31, 2004

(54) GENERATING A LIST OF PEOPLE RELEVANT TO A TASK

(75) Inventors: Dhananjay V. Keskar, Beaverton, OR (US); Dean M. Sanvitale, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/919,351

(22) Filed: Jul. 31, 2001

(65) Prior Publication Data

US 2003/0028524 A1 Feb. 6, 2003

(51) Int. Cl.[7] .............................................. G06F 17/30
(52) U.S. Cl. .................................. 707/10; 704/4; 704/1
(58) Field of Search ............................. 707/10, 4, 102, 707/2, 104, 200, 505, 104.1; 709/102, 200, 206; 345/751, 744; 712/1

(56) References Cited

U.S. PATENT DOCUMENTS

| | | | | |
|---|---|---|---|---|
| 5,515,492 A | * | 5/1996 | Li et al. ..................... 345/744 |
| 5,628,004 A | * | 5/1997 | Gormley et al. .......... 707/104.1 |
| 5,835,758 A | * | 11/1998 | Nochur et al. .............. 707/102 |
| 6,006,215 A | * | 12/1999 | Retallick ........................ 707/2 |
| 6,327,611 B1 | * | 12/2001 | Everingham ................. 709/206 |
| 6,539,421 B1 | * | 3/2003 | Appelman et al. .......... 709/206 |
| 2002/0019827 A1 | * | 2/2002 | Shiman et al. .............. 707/200 |
| 2002/0140730 A1 | * | 10/2002 | Linsey et al. ................ 345/751 |
| 2002/0156808 A1 | * | 10/2002 | Duffy et al. ................. 707/505 |
| 2002/0165898 A1 | * | 11/2002 | Duffy et al. ................. 709/102 |
| 2003/0009385 A1 | * | 1/2003 | Tucciarone et al. ........... 705/26 |
| 2003/0014610 A1 | * | 1/2003 | Mills et al. ..................... 712/1 |

* cited by examiner

Primary Examiner—Charles Rones
(74) Attorney, Agent, or Firm—Fish & Richardson P.C.

(57) ABSTRACT

Techniques for generating a list of people relevant to a task includes receiving content associated with a task, automatically generating a query for a list of people based on terms obtained from the content, generating the list of people in response to the query, and presenting the list of people to a user

25 Claims, 4 Drawing Sheets

GENERATING A LIST OF PEOPLE RELEVANT TO A TASK

BACKGROUND

This invention relates to generating lists of people relevant to a task.

It is common for computer users to communicate with one another over a network. Typically, one computer user communicates with other computer users by creating content associated with tasks such as composing an electronic mail (email) message, communicating in an instant messaging session or organizing a meeting using a calendaring program. Often, the computer user creates a list of people that might be interested in receiving the content associated with the task.

DETAILED DESCRIPTION

Figure 1:
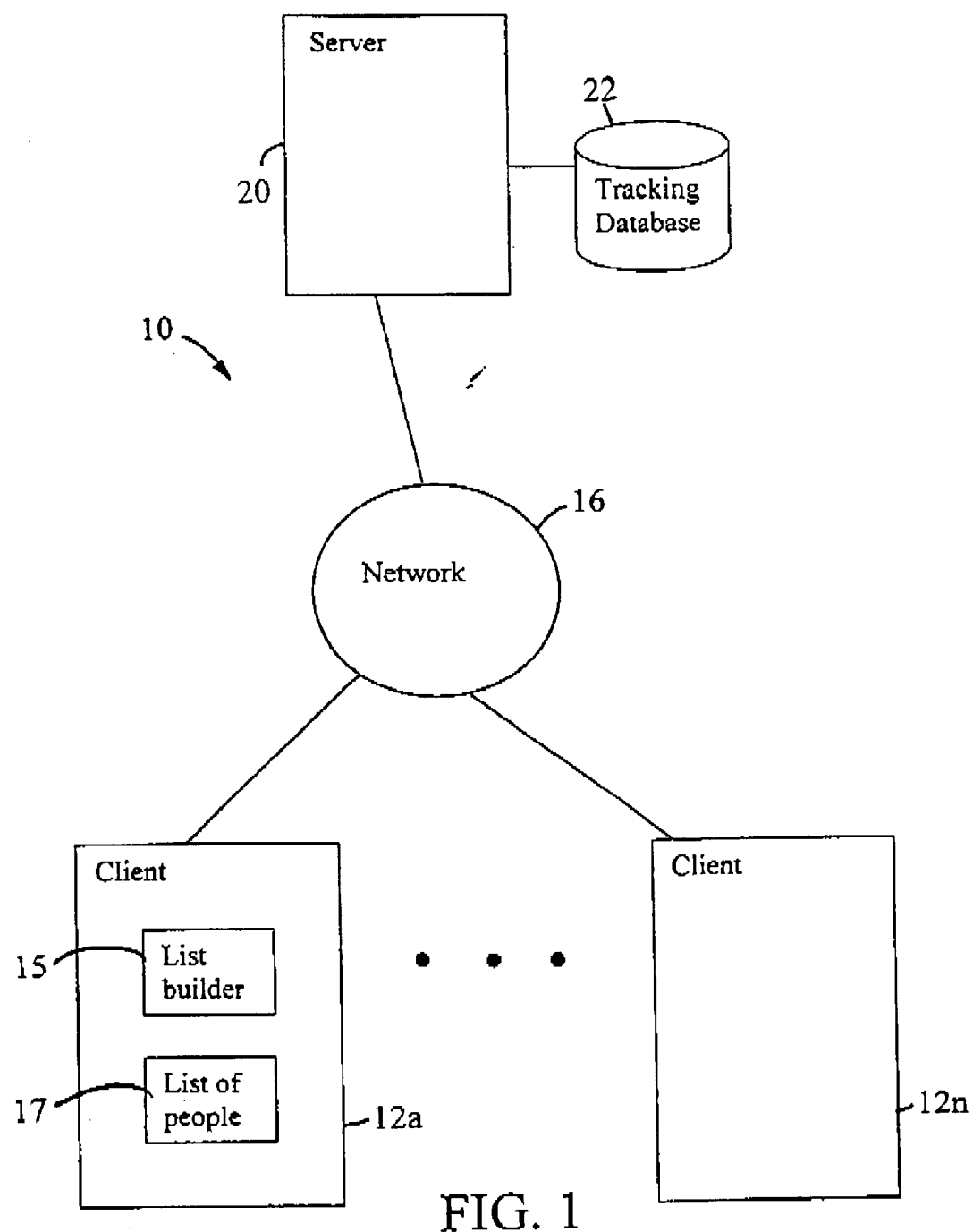
FIG. 1 illustrates a computer system.

As shown in FIG. 1, a system 10 includes clients 12a–12n capable of exchanging content, such as email messages, with other clients over a network 16. The clients 12a–12n communicate with a server 20 coupled to the network 16. Such a network can include, for example, the Internet, the World Wide Web (Web), peer-to-peer, Ethernet, local area network (LAN) or a wide area network (WAN). The server 20 includes a tracking database 22 for storing information associated with content previously exchanged by the clients 12a–12n over the network 16. Such information can include the names of persons who received the content, the type of content, key terms contained in the content or other information.

A client, such as client 12a, can communicate with other clients using a communications program such as an email application program or an instant messaging session program. For example, the client 12a can use an email application program to compose a message and send the message to another client over the network 16. The client 12a can use a list builder program 15 for generating a list of people 17 who may be interested in the content being composed by the client. The list builder 15 creates the list of people 17 by capturing selected terms from the content. The captured terms can be used to create a query for persons who may be interested in the content.

The query is directed to the tracking database 22 located at the server 20 or to a local copy of the tracking database provided on the client 12a. The server 20 processes the query by searching the tracking database 22 for previously stored content that may be similar to the content currently being composed by the client 12a. The results of the search can include a list of people 17 who previously may have received similar content. The list builder 15 automatically presents the list of people 17 to the user.

Figure 2:
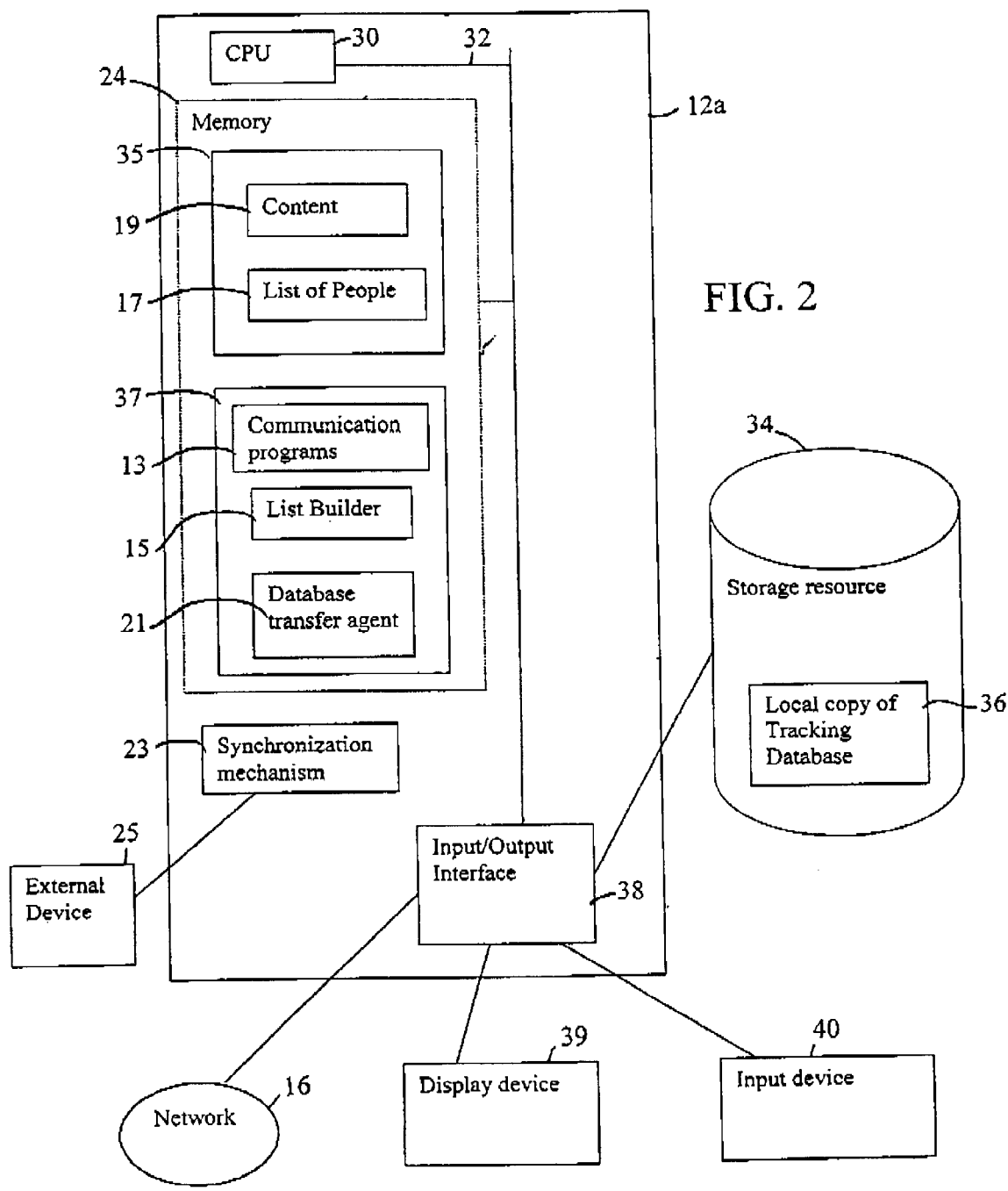
FIG. 2 illustrates further details of the computer system.

As shown in FIG. 2, the client 12a can be implemented as a computer such as a personal computer (PC), a personal digital assistance (PDA) or other device. The client 12a includes a central processing unit (CPU) 30 and a memory 34 connected to a bus 32. The CPU 30 can include, for example, an Intel Pentium® processor, or other processor. The CPU 30 processes data 35 and executes programs 37 residing in memory 24. The data 35 includes the list of people 17 generated by the list builder program 15, content 19 generated by the client 12a and other data used by the client 12a. Examples of programs 37 include a communications program 13, the list builder program 15 and a database transfer agent 21. In addition, other programs 37 can include an operating system (OS), device drivers and other programs that can be used by the client 12a.

An input/output interface 38 includes hardware and software elements that can be used to couple peripheral devices to the client 12a. For example, the input/output interface 38 couples the network 16 to the client 12a.

A display device 39 and an input device 40 are coupled to the client 12a using the input/output interface 38. The display device 39 can include a monitor for displaying information from the client 12a. Likewise, the input device 40, which may include a keyboard or electronic mouse, can be used to enter information into the client 12a.

The input/output interface 38 also is used to couple a storage resource 34 to the client 12a. The storage resource 34 can be used to store programs and data for the client 12a. For example, the storage resource 34 can be used to store a local copy of the tracking database 36. The storage resource 34 can be implemented using hard disks, optical drives or other storage devices.

The communications program 13 provides the client 12a with a means for composing content 19. The communications program 13 can assist the client 12a in such tasks as creating email messages, engaging in an instant messaging session or organizing a meeting. Examples of content 19 associated with the tasks include instant messages, email messages, meeting agenda, meeting time or short message service (SMS) messages.

The list builder 15 is a program that facilitates the creation of the list of people 17. The list 17 can include the names of persons who might be interested in the content 19 being composed by the client 12a, the email addresses of the persons, the instant messaging sign-on names of the persons, and the expected interest levels the persons may have in the content being composed. The list builder 15 can be implemented as a stand-alone program residing in the client 12a or the server 20. Alternatively, the list builder 15 can be integrated with other programs such as an operating system, a device driver, or the communications program 13. The operation of the list builder 15 is discussed in detail below.

The database transfer agent 21 includes a program which may be used to create a local copy of the tracking database 36. As discussed below, the database transfer agent 21 can create a local copy of the tracking database 36 by transferring portions of the tracking database 22 from the server 20 to the client 12a. A database program such as Microsoft® Access can manage the local copy of the tracking database 36.

The synchronization mechanism 23 can be a combination of hardware and software components that synchronizes the transfer of information between the client 12a and an external device 25 such as a personal digital assistant (PDA) or a handheld device. The synchronization mechanism 23 can detect the presence of the external device 25 when it is coupled to the client 12a. The external device 25 can be coupled to the client 12a using wired or wireless technologies. Once coupled, information such as the local copy of the tracking database 36 can be transferred to the external device 25. Similarly, the synchronization mechanism 23 can be use to transfer information from the external device 25 to the client 12a.

As discussed above, the list builder 15 can direct queries to the tracking database 22 to produce a list of people 17 who might have an interest in the content 19 being composed by the client 12a. The tracking database 22 can be created and maintained on any computer that is centrally located and accessible. The computer can be capable of communicating over the network 16 using hypertext transport protocol (HTTP). HTTP is an application-level protocol for distributed, collaborative, hypermedia information systems (See http://www.w3.org/Protocols/rfc2068/rfc2068).

The tracking database 22 can be organized using tables arranged into rows containing fields for storing data. In the following discussion of the tracking database 22 illustrated in FIG. 3, the term "document" corresponds to "content" 19 and "users" corresponds to "clients 12a–12n".

Figure 3:
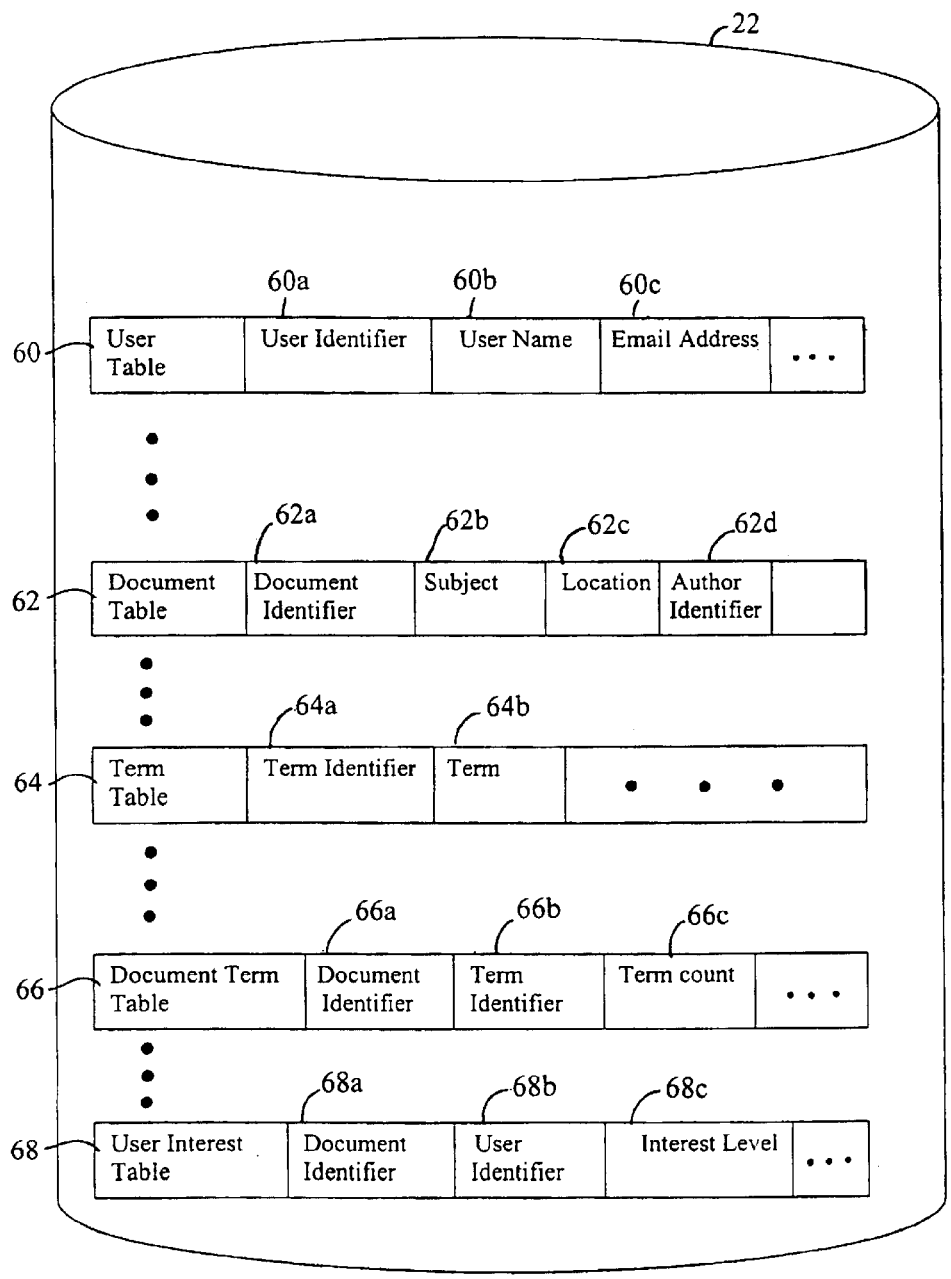
FIG. 3 illustrates a tracking database.

In the implementation illustrated in FIG. 3, the tracking database 22 includes a user table 60. Each row in the table 60 can be associated with information related to a user who is a recipient of a document such as an email message. The user table 60 includes a user identifier field 60a that contains a unique identifier specifying the recipient of a previously received document. The user table 60 also contains a user name field 60b which can contain the name of the user who received the document. Similarly, the user table 60 contains an email address field 60c which can include the email address of the user specified in the user identifier field 60a.

The tracking database 22 includes a document table 62 with a row containing information associated with documents previously transmitted. The document table 62 includes a document identifier field 62a which can contain a unique identifier associated with a previously transmitted document such as an email message. A subject field 62b contains the subject matter associated with the document. For example, in an email application, the subject matter can be derived from the "subject" heading in an email message.

The document table 62 also contains a location field 62c which can be populated with data related to the location of the document. In an email application, the location field 62c can be used to point to the location where the email message is stored. Such a storage location can include a separate email server which operates in conjunction with the tracking database 22 located at the server 16. Alternatively, the functionality of the email server and the server 16 can be combined into a single server providing a centralized system for storing email messages and for storing information associated with the messages. The document table 62 also includes an author identifier field 62d which can be used to store an identifier specifying the author or creator of the document.

In addition, the tracking database 22 includes a terms table 64 that has a row containing information associated with each term in the document. The terms table 64 includes a term field 64b which can be used to store each unique term that is found in the documents that have been previously transmitted. In addition, a term identifier field 64a can be used to assign a unique identifier to the term stored in the term field 64b. There are certain common words that can be excluded from the terms field 64b such as words "the" and "and".

The tracking database 22 includes a document term table 66 containing a row of information indicating the relationship between a particular document and terms that appear in that document. A document identifier field 66a can contain a unique identifier corresponding to a document that was transmitted previously. A term identifier field 66b can be populated with the identifier of a term that appeared in the document specified by the document identifier field 66a. The term indicated in the term identifier field 66b corresponds to a term identifier field 64a in the term table 64. Similarly, the document specified in the document identifier field 66a corresponds to a document identifier field 62a in the document table 62. A term count field 66c can be used to hold the number of times that the term specified by the term identifier field 66b occurs in the document specified by the document identifier field 66a.

In addition, the tracking database 22 includes a user interest table 68 which contains a row of information indicating the relationship between a particular document and the user interest in that document. The user interest table 68 includes a document identifier field 68a containing a unique identifier corresponding to the document identifier 62a field in the document table 62. A user identifier field 68b contains a unique identifier with a reference to a user specified in the user identifier field 60a in the user table 60. A user interest level field 68c contains data reflecting the amount of interest the user expressed towards the document. The tracking database 22 can allow the user to provide feedback regarding the level of interest with respect to the document.

Fields in the tracking database 22 can be populated using one of several methods. As discussed above, the tracking database 22 can be located at the server 16 and configured to process query requests using HTTP. The communications program 13 can create documents and monitor document activity.

When the client 12a composes a document or forwards a document such as an email message, the communications program 13 directs a HTTP based request to the tracking database 22. The HTTP request includes information associated with the document to populate the fields in the tracking database 22. In response to the HTTP request, the tracking database 22 creates or modifies table entries based on the information contained in the HTTP request.

In one implementation, a new user table entry 60 is created in the tracking database 22 corresponding to the user or recipient of the document. A document table entry 62 is added to identify the document, and a term table entry 64 is added based on terms in the document. In addition, a document term table entry 66 can be added and can be populated with information associated with the terms that are present in the document. A user interest table 68 can be added to reflect the level of interest the recipient is likely to have regarding the document.

As discussed above, the database transfer agent 21 can be used to create a local copy of the tracking database 36 derived from the tracking database 22. The size of the tracking database 22 may be quite large and may contain information that is not relevant to the client 12a. Therefore, the local copy of the tracking database 36 may contain only a portion of the tracking database 22 that is relevant to the client 12a. As a result, the list builder 15 can make a query directed to the local copy of the tracking database 36 and avoid the tracking database 22 located on the server 16. That may be useful, for example, when the server 16 is either unavailable or overloaded with requests from other clients.

As explained above, the synchronization mechanism 23 can be used to transfer the local copy of the tracking database 36 to the external device 25. The external device 25 may have modified its copy of the tracking database during the course of operation. The synchronism mechanism 23 may be used to synchronize the modified copy of the tracking database located at the external device 25 with the local copy of the tracking database 36 located on the client 12a. Synchronization can assure that the data in the tracking database 22 is synchronized with the data in the handheld device and the local copy of the tracking database 36.

Figure 4:
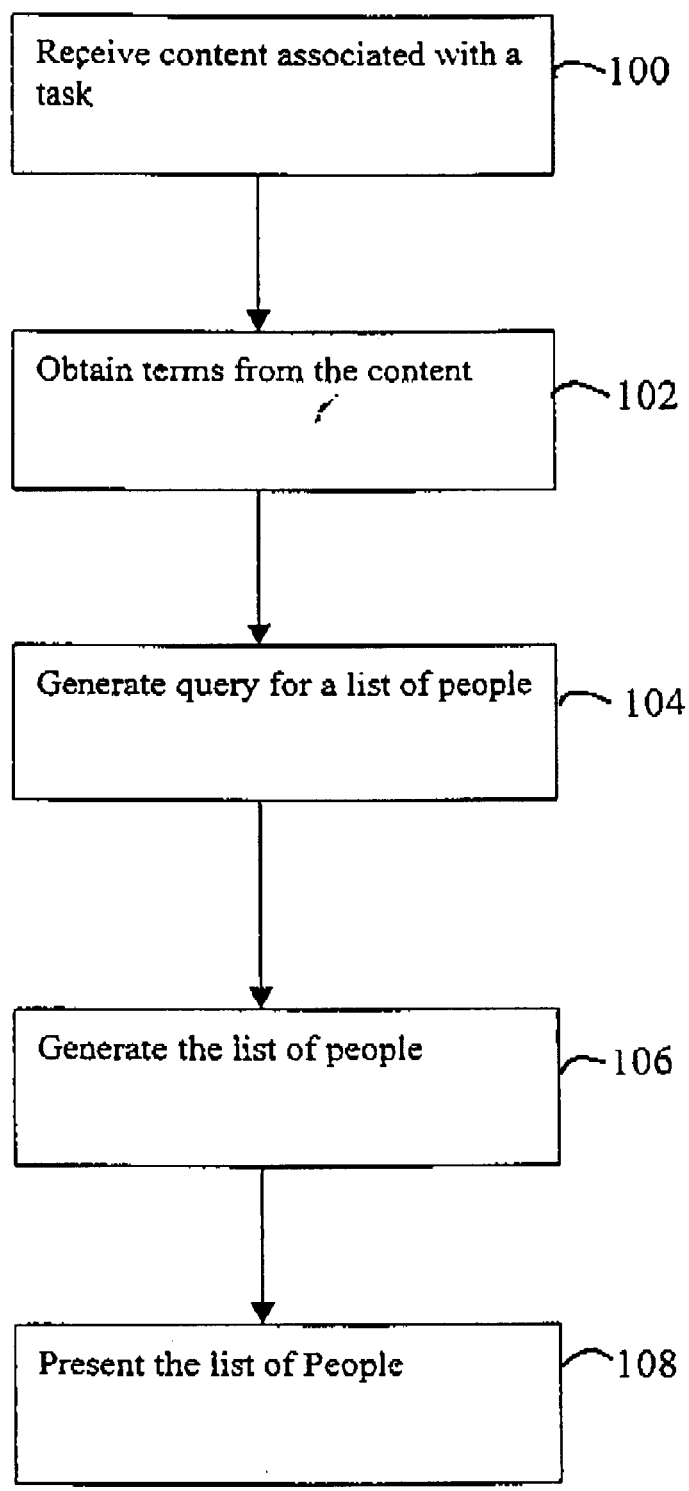
FIG. 4 is a flow chart of a method of generating a list of people.

FIG. 4 is a flow chart of a method for creating a list of people 17 who may be relevant to the content 19. The list builder 15 receives 100 the content 19 associated with a task and can process portions of the content 19 as it is being composed. Portions of the content can include logical units such as sentences or paragraphs. Processing a portion of the content can help reduce the number of queries that are directed to the tracking database 22.

Once the list builder 15 receives the content 19 (block 100), the list builder 15 generates 102 a query for a list of people based on the terms obtained from the content. The client can customize the terms that are obtained from the content 19. Common terms, such as the word "the", can be excluded from the query which may help reduce the amount of processing necessary to execute the query. Terms can include single words or phrases. As discussed above, the list builder 15 directs the query to the tracking database 22 located at the server 16 or to the local copy of the tracking database 36 which can be located at the client 12a.

The query can be constructed using various database query languages such as the structured query language (SQL). Alternatively, the query can be constructed using a string of terms, and the query can be sent over the network 16 using HTTP. Upon receipt of the query, the tracking database 22 can parse the query and generate SQL that can be applied to the database.

The list of people 17 can be generated 104 based on the results of the received query. The information in the query can be used to search the tables in the tracking database 22. For example, in an email application, the terms extracted from the email message can be used to search for similar terms in the term table 64. If the term is found in the term field 64b, then the corresponding term identifier in the term identifier field 64a can be used to search the document table 62 for documents that contain similar terms. If documents with the same or similar terms are found, then the corresponding document identifier field 62a is used to search the user interest table 68. If a user is found with a sufficient interest indicated by the value in the interest level field 68c, then the user information in a corresponding user table 60 is included in the list of people 17.

Once the list of people 17 has been generated (block 104), the list is presented 106 to the user on the display 39. Additional criteria can be applied to the list of people 17 before the list is presented to the client 12a. The criteria can help refine the names of persons in the list 17 and can include factors such as the physical location of the recipient, the organizational distance of the recipient relative to the sender (i.e., same team, department, division, etc.), the structural distance of the recipient relative to the sender (i.e., peer, a level up or down in management, etc.), currently scheduled meetings for the sender (i.e., current working group, etc.), recent communication by the sender (i.e., email, instant messages, SMS messages, etc.), or periodic correspondence communication (i.e., one week ago, one quarter ago, etc).

The foregoing techniques can improve the task efficiency. By automatically providing a list of people 17 that are relevant to the task and content, the client 12a may avoid the need to search through a large address book to create the list. In an email application, recipients who may have an interest can be presented automatically to the author of an email message. Similarly, meeting attendees can be added to the list of people as the meeting agenda and other content are being added to the meeting notice. In an instant messaging scenario, the list of people who might be interested in similar content can be added to a buddy list.

The foregoing techniques can provide correlation across different tasks. For example, a recipient of an email message with content similar to content in a meeting agenda may be a potential meeting attendee. Likewise, a meeting attendee for a meeting on a particular topic may be interested in receiving email pertaining to the same topic. If the meeting is to be held online, then the techniques can be used to invite potentially interested participants into an instant messaging chat room.

Many interactions occur within a relatively small group of people who share similar interests over extended periods. The techniques can improve the locality of a workgroup, in other words, the degree of closeness between persons in a workgroup. The group of people also exhibit locality at several levels such as physical location, organizational affiliation, or organizational roles (i.e. most meetings with peers, or one level up or down, etc.).

Generating a list of people 17 relevant to the task and content can simplify user interaction and can allow for enriched application features despite a limited display screen size. Moreover, the techniques can improve the task performance of the client 12a when it is implemented, for example, as a desktop computer. The user may no longer need to scroll through the entire address book for people who may be interested in the content.

Various features of the invention can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer or processor, for configuring and operating the computer when the storage medium is read by the computer to perform the functions described above.

Other implementations are within the scope of the following claims.

What is claimed is:

1. A method comprising:
   receiving content associated with a task;
   using a computer to automatically generate a query, in response to receipt of the content, for a list of people based on terms obtained from the content;
   using a computer to generate the list of people in response to the query;
   using a computer to present the list of people to a user, wherein the list of people is automatically generated and dynamically updated as the content associated with the task is being composed; and
   incorporating persons selected from the list of people into the task, wherein the task includes at least one of an instant messaging message, an electronic mail message, or a meeting agenda.

2. The method of claim 1 including automatically generating a query for a list of people repeatedly, wherein each query is based on terms obtained from a portion of content.

3. The method of claim 1 including searching a tracking database for terms and content stored in the database that are similar to the terms obtained from the content.

4. The method of claim 1 including searching a tracking database for identifiers associated with persons having an interest in the received content.

5. The method of claim 1 including generating a list of people associated with different tasks, in response to the query.

6. The method of claim 1 including presenting the list of people after applying a criteria based on a locality of persons identified in the list.

7. An apparatus comprising:
   a memory; and
   a processor coupled to the memory and configured to:
      receive content associated with a task,
      automatically generate a query, in response to receipt of the content, for a list of people based on terms obtained from the content,
      generate the list of people in response to the query,
      wherein the list of people is automatically generated and dynamically updated as the content associated with the task is being composed, present the list of people to a user, and incorporate persons selected from the list of people into the task, wherein the task includes at least one of an instant messaging message, an electronic mail message, or a meeting agenda.

8. The apparatus of claim 4 wherein the processor is configured to automatically generate a query for a list of people repeatedly, wherein each query is based on terms obtained from a portion of content.

9. The apparatus of claim 7 wherein the processor is configured to search the tracking database for terms and content stored in the database that are similar to the terms obtained from the content.

10. The apparatus of claim 7 wherein the processor is configured to search a tracking database for identifiers associated with persons having an interest in the received content, the databases having an interest level field indicating a level of interest a person expressed towards content similar to the received content.

11. The apparatus of claim 7 wherein the processor is configured to present the list of people after applying a criteria based on a locality of persons identified in the list of the people.

12. An article comprising a computer-readable medium that stores computer-executable instructions for causing the computer to:

automatically generate a query for a list of people based on terms obtained from content in response to receiving the content;

generate the list of people in response to the query, wherein the list of people is automatically generated and dynamically updated as the content associated with the task is being composed;

present the list of people to a user; and incorporate persons selected from the list of people into a task, wherein the task includes at least one of an instant messaging message, an electronic mail message, or a meeting agenda.

13. The article of claim 12 including instructions for causing the computer to automatically generate a query for a list of people based on terms obtained from a portion of content.

14. The article of claim 12 including instructions for causing the computer to search a tracking database for terms and content stored in the database that are similar to the terms obtained from the content.

15. The article of claim 12 including instructions for causing the computer to search a tracking database for identifiers associated with persons having an interest in the received content, the databases having an interest level field indicating a level of interest a person had expressed towards content similar to the received content.

16. The article of claim 12 including instructions for causing the computer to address the query to a local tracking database.

17. The article of claim 12 including instructions for causing a computer to automatically generate a list of people associated with different tasks.

18. The article of claim 12 including instructions for causing the computer to present the list of people after applying a criteria based on a locality of persons identified in the list of the people.

19. A system comprising:

a tracking database;

a client computer comprising:
a memory; and
a processor coupled to the memory and configured to:
receive content associated with a task,
generate a query, in response to receipt of the content, for a list of people based on the terms obtained from the content,
generate the list of people in response to the query, wherein the list of people is automatically generated and dynamically updated as the content associated with the task is being composed,
present the list of people to a user; and
incorporate persons selected from the list of people into the task, wherein the task includes at least one of an instant messaging message, an electronic mail message, or a meeting agenda;

a server computer comprising;

a memory; and a processor coupled to the memory and configured to:
receive a query for a list of people based on the terms obtained from the content,
search the tracking database using the terms obtained from the content, and
generate a list of people based on the results of searching the tracking database, and
send the list of people to the client computer; and a network over which the tracking database, the client computer and the server computer communicate.

20. The system of claim 19 wherein the processor of the client computer is configured to obtain terms from a portion of content associated with the task.

21. The system of claim 19 wherein the processor of the server computer is configured to search the tracking database for terms and content stored in the database that are similar to the terms obtained from the content.

22. The system of claim 19 wherein the processor of the server computer is configured to search the tracking database for identifiers associated with persons having an interest in the received content, the databases having an interest level field indicating a level of interest a person had expressed towards content similar to the received content.

23. The system of claim 19 wherein the processor of the client computer is configured to generate a list of people associated with different tasks.

24. The system of claim 19 wherein the processor of the client computer is configured to present the list of people to the client computer after applying a criteria based on a locality of persons identified in the list.

25. The system of claim 19 wherein the processor of the client computer is configured to address the query to a local tracking database.

* * * * *